(12) United States Patent
Koike (10) Patent No.: US 8,437,477 B2
(45) Date of Patent: May 7, 2013

(54) KEY INFORMATION ISSUING DEVICE, WIRELESS OPERATION DEVICE, AND PROGRAM

(75) Inventor: Nobuyuki Koike, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/418,256

(22) Filed: Apr. 3, 2009

(65) Prior Publication Data

US 2009/0225989 A1 Sep. 10, 2009

Related U.S. Application Data

(62) Division of application No. 10/850,061, filed on May 20, 2004, now Pat. No. 7,561,695, which is a division of application No. 10/047,564, filed on Jan. 14, 2002, now Pat. No. 7,081,806.

(30) Foreign Application Priority Data

Aug. 3, 2001 (JP) .................................. 2001-236869

(51) Int. Cl.
*H04L 9/08* (2006.01)
(52) U.S. Cl.
USPC ............................................ 380/278; 380/44
(58) Field of Classification Search .................. 380/278, 380/44
See application file for complete search history.

(56) References Cited

U.S. PATENT DOCUMENTS

| | | | |
|---|---|---|---|
| 5,201,066 A | 4/1993 | Kim | |
| 5,475,376 A | 12/1995 | Chikamitue et al. | |
| 5,566,225 A | 10/1996 | Haas | |
| 5,784,566 A | 7/1998 | Viavant et al. | |
| 5,887,063 A | 3/1999 | Varadharajan et al. | |
| 5,973,756 A | 10/1999 | Erlin | .............................. 348/734 |
| 6,021,203 A | 2/2000 | Douceur et al. | |

(Continued)

FOREIGN PATENT DOCUMENTS

| | | |
|---|---|---|
| EP | 0 809 171 | 11/1997 |
| EP | 0 870 889 A2 | 10/1998 |

(Continued)

OTHER PUBLICATIONS

Data Book Soft Microcontroller, XX, XX, Oct. 1993, pp. 1-3, 7-8, 73, 77-80, 82, 229, 290-292.

(Continued)

*Primary Examiner* — Kambiz Zand
*Assistant Examiner* — Aubrey Wyszynski
(74) *Attorney, Agent, or Firm* — Greer, Burns & Crain, Ltd.

(57) ABSTRACT

A wireless apparatus including a button; a wireless communication interface; a processing unit to output encryption key information to another wireless apparatus using the wireless communication interface with lower transmission output than transmission output of information other than the encryption key information, responsive to detection of user's operation for the button; and a memory to store the output encryption key information corresponding to the another wireless apparatus. The wireless communication interface receives wireless signals from the another wireless apparatus and the processing unit decodes the information contained in the wireless signals and encrypted with the encryption key information. Also disclosed is an encryption key information managing method of managing encryption key information and a non-transitory readable-by-computer recording medium recorded with a program executed by a computer to manage encryption key information.

7 Claims, 10 Drawing Sheets

U.S. PATENT DOCUMENTS

| | | | |
|---|---|---|---|
| 6,078,265 A * | 6/2000 | Bonder et al. | 340/5.23 |
| 6,140,939 A | 10/2000 | Flick | |
| 6,167,137 A | 12/2000 | Marino et al. | |
| 6,181,255 B1 | 1/2001 | Crimmins et al. | 340/825.69 |
| 6,191,701 B1 | 2/2001 | Bruwer | |
| 6,377,173 B1 | 4/2002 | Desai | 340/539 |
| 6,384,711 B1 * | 5/2002 | Cregger et al. | 340/5.65 |
| 6,445,291 B2 * | 9/2002 | Addy et al. | 340/539.22 |
| 6,455,291 B1 * | 9/2002 | Yan et al. | 435/194 |
| 6,522,240 B1 * | 2/2003 | Weiss et al. | 340/5.25 |
| 6,650,629 B1 | 11/2003 | Takahashi et al. | |
| 6,708,275 B1 | 3/2004 | Stolz | |
| 6,784,872 B1 * | 8/2004 | Matsui et al. | 345/169 |
| 2001/0014944 A1 | 8/2001 | Ibi et al. | |
| 2002/0010860 A1 * | 1/2002 | Chu | 713/182 |
| 2005/0081035 A1 | 4/2005 | Togawa | |

FOREIGN PATENT DOCUMENTS

| | | |
|---|---|---|
| EP | 0 998 080 | 5/2000 |
| EP | 0 870 889 A3 | 4/2001 |
| FR | 2788154 | 7/2000 |
| JP | 62-029333 | 2/1987 |
| JP | 04-072841 | 3/1992 |
| JP | 04-243355 | 8/1992 |
| JP | 05-083243 | 4/1993 |
| JP | 05-191381 | 7/1993 |
| JP | 06-026266 | 2/1994 |
| JP | 09-051593 | 2/1997 |
| JP | 9-114719 | 5/1997 |
| JP | 09-167098 | 6/1997 |
| JP | 10-091531 | 4/1998 |
| JP | 10-511778 | 11/1998 |
| JP | 11-015789 | 1/1999 |
| JP | 11-232553 | 8/1999 |
| JP | 2000-069568 | 3/2000 |
| JP | 2000-106550 | 4/2000 |
| JP | 2002-271320 | 9/2002 |
| WO | 96/20461 | 7/1996 |
| WO | WO 00/27086 | 5/2000 |
| WO | WO 01/03086 A1 | 1/2001 |

OTHER PUBLICATIONS

Portal, USPTO, The ACM Digital Library; http://portal.acm.org/results.cfm?coll=ACM&dl=ACM&CFID=24788652&CFTOKEN=90766769, Mar. 1, 2009.

Final Decision of Rejection issued in Japanese Patent App. No. 2001-236869, mailed Sep. 14, 2010.

Extended European Search Report issued in corresponding European Application No. 07114568.4 on Jun. 9, 2011.

Office Action issued by the Patent Office of Japan dated May 29, 2012, for corresponding JP Application No. 2010-036675 (with English language translation).

Eiji Okamoto, "Cryptographic Key Delivery Management in Cryptographic Technology for realizing Bright Information Society 5," bit, vol. 23, No. 12, pp. 1607-1615, published by Kyoritsu Shuppan Co., Ltd., Nov. 1, 1997 (part. English language translation).

Office Action issued by the Patent Office of Japan dated Dec. 11, 2012, for corresponding JP Application No. 2010-278165 (with copy of English language translation).

* cited by examiner

EXAMPLE OF START-OF-COMMUNICATION PACKET

| HEADER | PACKET ID | REMOTE CONTROLLER ID | DUMMY DATA | CHECKSUM |
|---|---|---|---|---|
| 55AA | 0000 | 12345678 | 0000000000··· | 3F |

EXAMPLE OF COMMUNICATION PERMISSION PACKET

| HEADER | PACKET ID | REMOTE CONTROLLER ID | SESSION ID | DUMMY DATA | CHECKSUM |
|---|---|---|---|---|---|
| 55AA | 0001 | 12345678 | 41943786 | 00··· | 61 |

EXAMPLE OF BUTTON INFORMATION/DUMMY PAKCET

| HEADER | PACKET ID | REMOTE CONTROLLER ID | ENCRYPTED BUTTON INFORMATION OR DUMMY DATA | CHECKSUM |
|---|---|---|---|---|
| 55AA | 0002 | 12345678 | 01987d4fa34f45a09185b197 | 8b |

EXAMPLE OF ACKNOWLEDGEMENT PACKET

| HEADER | PACKET ID | REMOTE CONTROLLER ID | CHECKSUM OF RECEIVED PACKET | NEXT SESSION ID | CHECKSUM |
|---|---|---|---|---|---|
| 55AA | 0003 | 12345678 | 8b | 9858950 | C4 |

KEY INFORMATION ISSUING DEVICE, WIRELESS OPERATION DEVICE, AND PROGRAM

This application is a divisional of U.S. application Ser. No. 10/850,061, filed May 20, 2004, which is now U.S. Pat. No. 7,561,695 which is a divisional of U.S. application Ser. No. 10/047,564, filed Jan. 14, 2002, which is now U.S. Pat. No. 7,081,806.

BACKGROUND OF THE INVENTION

The present invention relates to a key information processing technology.

Key information has hitherto been utilized in a variety of scenes in the human society. For example, data communications requiring the confidentiality of information involve using encryption keys. Further, what key information is recorded on magnetic stripes is used as a key for a building and an office as a substitute for a metallic key matching with a configuration of a key hole. Pieces of information on encryption keys and keys for the buildings etc are generically termed key information.

The prior art system is, however, incapable of easily changing such a piece of key information and reissuing the key information. Alternatively, even if capable of reissuing the key information, a cipher is required to be stored, and hence the re-issuance needs a re-storing process, which is time-consuming. Therefore, though the encryption keys are used in the communications between information devices such as personal computer (which hereinafter be abbreviated to a PC) and so on, simple communications performed in daily life such as communications between a TV receiver and a wireless remote controller thereof and communications between a wireless keyboard and the personal computer, do not involve the use of the encryption keys.

Supposing that, for instance, home banking through the wireless remote controller and the wireless keyboard will be conducted from now on into the future, however, it is desirable that those communications be performed in an encryption-oriented system. It is because a password etc of a bank account might be intercepted (wiretapped).

It is required that a cipher be agreed upon between communication devices in order for communicating parties to decrypt such a cipher. Accordingly, there is needed a system capable of readily issuing the encryption key with security between the TV receiver and the wireless remote controller and between the PC and the wireless keyboard.

On the other hand, magnetic stripe type and IC card type keys (which will hereinafter be called electronic keys) used for locking and unlocking, e.g., a building, an office and so on, are convenient to carry and therefore easy to be lost and to become a target for theft. These types of keys are managed by, e.g., a center of a key (or building) management company.

Hence, if such a key is lost, all the keys distributed for using the building and offices must be collected, and the key information must be rewritten. The collection and re-issuance of the keys are very time-consuming.

SUMMARY OF THE INVENTION

It is a primary object of the present invention to provide a technology capable of easily issuing key information to a key information retaining device that retains the key information.

It is another object of the present invention to provide a technology capable of ensuring sufficient security for protecting the key information when issued from being intercepted.

To accomplish the above objects, according to one aspect of the present invention, a key information issuing device (1, 1A, 1B) issuing key information to a key information retaining device (2, 2A, 2B), comprises an authentication module (14, 3) authenticating an issuer of the key information, an output module (13) outputting the key information to the key information retaining unit, and a recording module (11) recording a mapping of the issued key information to the key information retaining unit, wherein the key information is issued in response to an indication of the authenticated issuer.

Preferably, the key information retaining device (2, 2A, 2B) may be a wireless operation device (2, 2A) wirelessly connected to an information device and may include a key information input module (23) inputting the key information in contact with the key information issuing device, and the output module (13) may include a contact module outputting the key information in contact with the key information input module (23).

Preferably, the key information retaining device (2, 2A, 2B) may be a wireless operation device (2, 2A) wirelessly connected to an information device and may include a medium input module inputting information from a recording medium, and the output module (13) may include a recording medium write module writing the information to the recording medium, and may issue the key information through the recording medium.

Preferably, the key information retaining device (2, 2A, 2B) may be a wireless operation device (2, 2A) wirelessly connected to an information device and may include a near communication module incapable of performing communications beyond a predetermined distance, and the output module (13) may include a near communication module incapable of performing the communications with the key information retaining device beyond a predetermined distance, and may issue the key information through the near communication module.

Preferably, the key information issuing device (1, 1A) may further comprise a receiving module (13) receiving wireless signals from the key information retaining device, and a decoding module (11) decoding the information contained in the wireless signals and encrypted with the key information.

According to another aspect of the present invention, a wireless operation device (2, 2A) wirelessly connected to an information device, comprises a key information input module (23) inputting key information for encrypting the information, a recording module (24) recording the key information, an operation module (22) detecting an operation of a user, an encryption module (21) encrypting user's operation based input information with the key information, and a transmission module (25) transmitting the encrypted input information to the information device.

Preferably, the key information input module (23) may include a contact module inputting the key information in a contact manner.

Preferably, the key information input module (23) may include a medium input module inputting information from a recording medium.

Preferably, the key information input module (23) may include a near communication module incapable of performing communications beyond a predetermined distance.

Preferably, the wireless operation device (2, 2A) may further comprise a setting module setting an execution or non-execution of the encryption, wherein the encryption module may encrypt the input information when the execution of the encryption is set.

According to still another of the present invention, a wireless operation device (2, 2A) wirelessly connected to an information device, comprises an operation module (22) detecting a user's operation, a transmission module (25) transmitting user's operation based input information, and a confirmation module (21) confirming whether there is a response signal from the information device with respect to the transmitted input information, wherein the transmission of the input information is stopped if the response signal is not obtained.

According to a further aspect of the present invention, a wireless operation device (2, 2A) wirelessly connected to an information device, comprises an operation module (22) generating input information by detecting a user's operation, a simulated information generating module (21) generating simulated information simulating the input information, and a transmission module (25) transmitting the input information or the simulated information.

Preferably, the simulated information may be transmitted irrespective of whether the user's operation is made or not (S2A-S2C).

Preferably, the key information retaining device (2, 2A, 2B) may be an electronic key (2B) that unlocks a predetermined area.

According to a still further aspect of the present invention, a key information managing method of managing key information issued to a key information retaining device, comprises authenticating an issuer of the key information (S10-S11), generating key information (S15), outputting the key information to the key information retaining unit (S16), and recording a mapping of the issued key information to the key information retaining unit (S1B).

According to a yet further aspect of the present invention, there is provided a program executed by a computer to actualize any one of the functions described above.

According to an additional aspect of the present invention, there is provided a non-transitory readable-by-computer recording medium recorded with such a program.

As described above, according to the present invention, it is possible to ensure the sufficient security for protecting the communication between the information device and the wireless remote control from being intercepted. According to the present invention, the key information can be easily issued to the key information retaining device for retaining the key information. Further, according to the present invention the sufficient security against the interception can be ensured when issuing the key information.

DETAILED DESCRIPTION OF THE PREFERRED EMBODIMENTS

Preferred embodiments of the present invention will hereinafter be described with reference to the accompanying drawings.

<<First Embodiment>>

Figure 1:
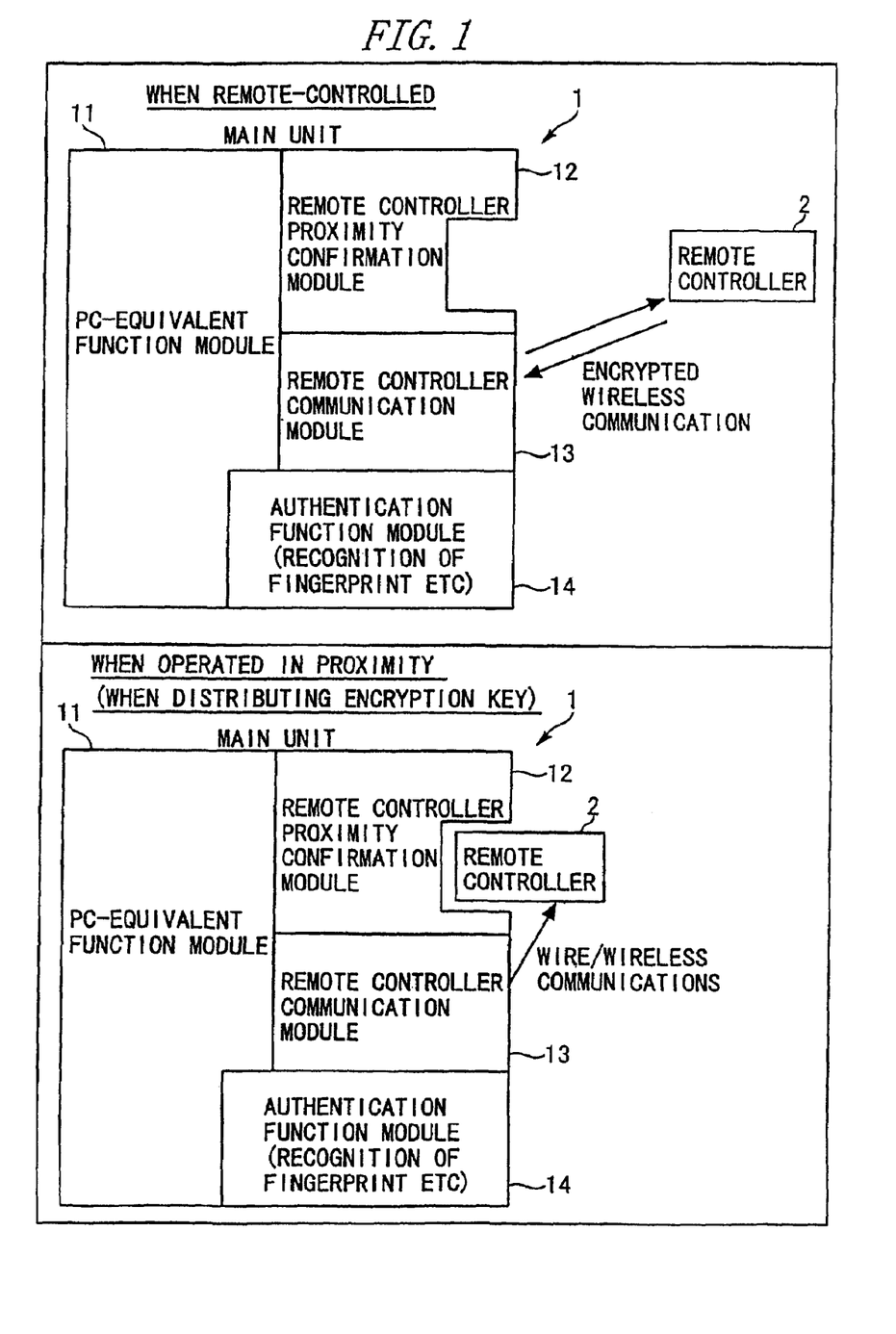
FIG. 1 is a diagram showing an information system as a whole in a first embodiment of the present invention.
Figure 2:
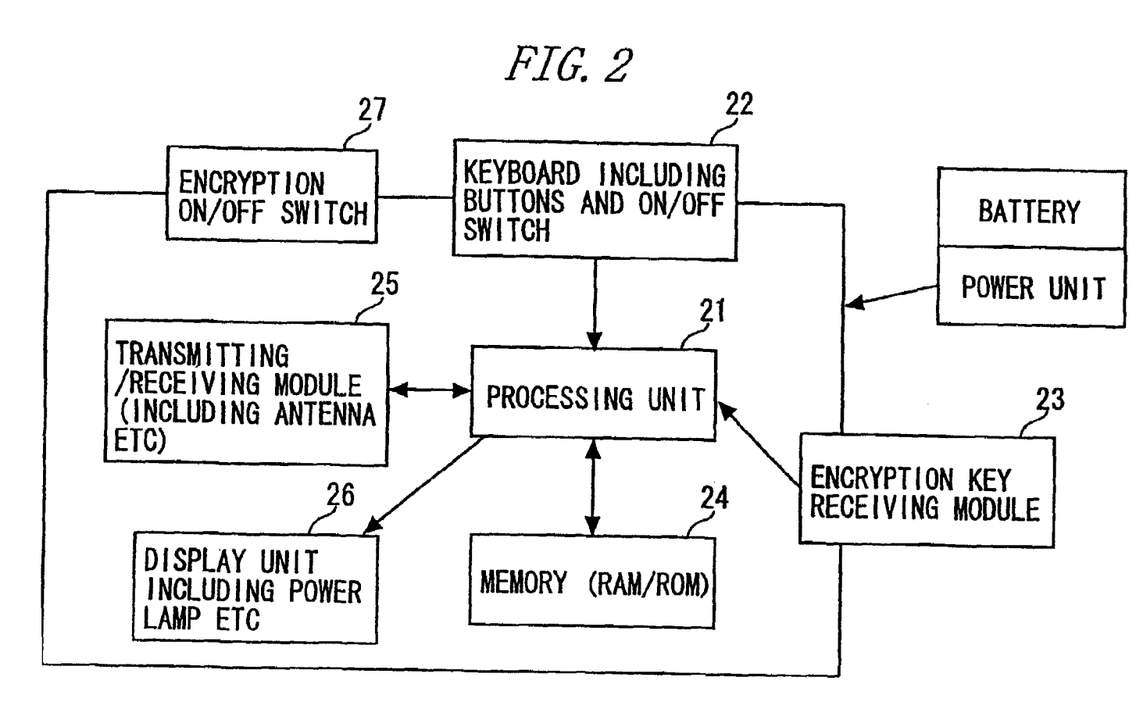
FIG. 2 is a block diagram showing a remote controller 2.
Figure 3:
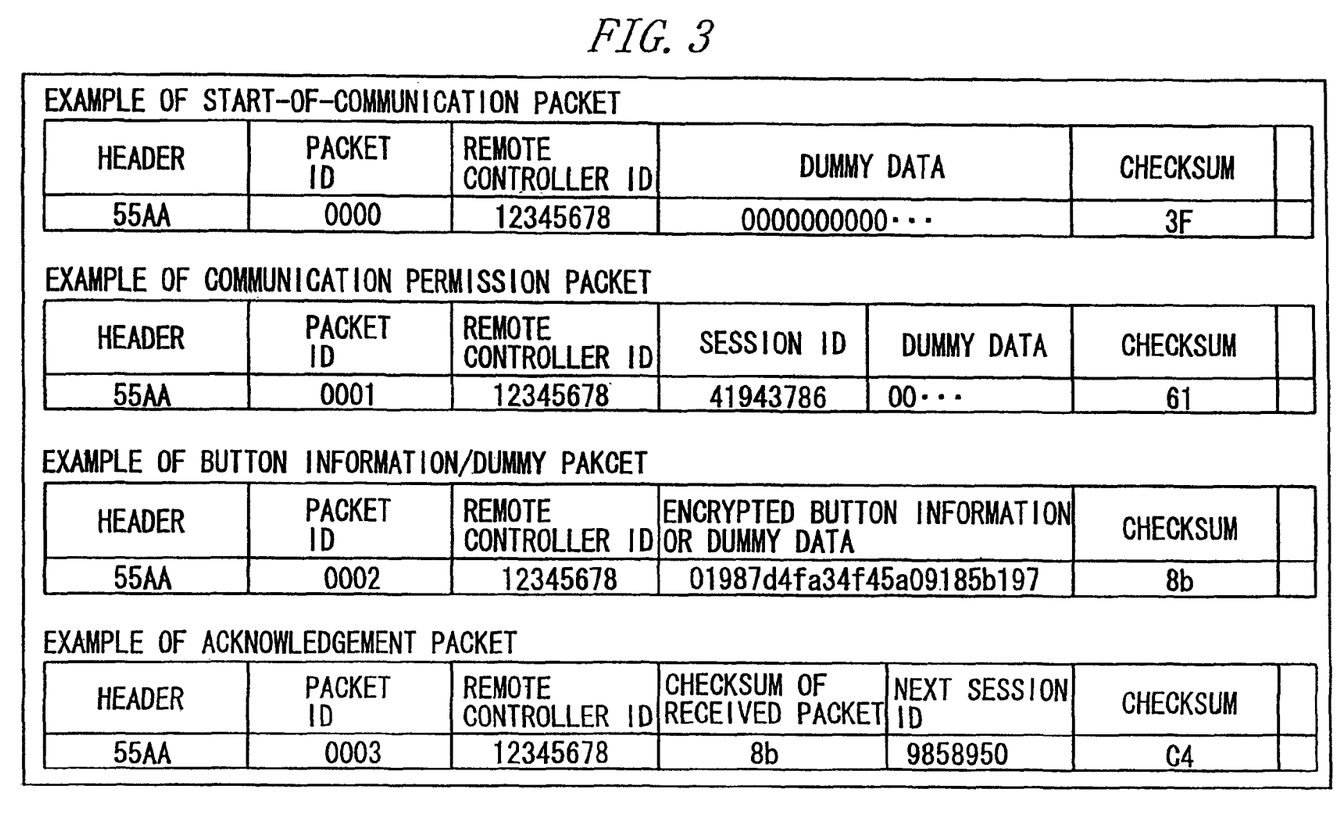
FIG. 3 is a diagram showing a data structure of a packet.
Figure 4:
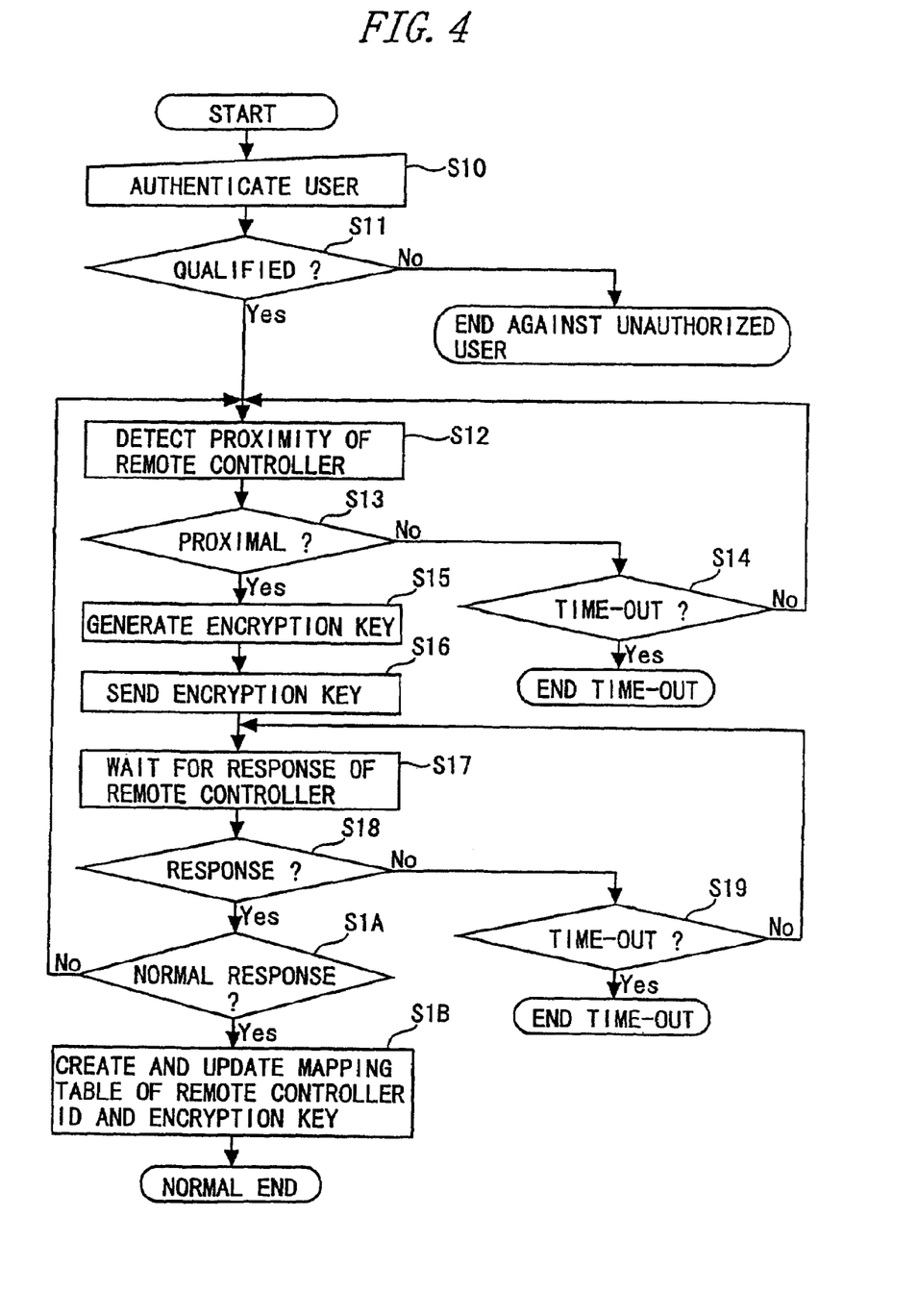
FIG. 4 is a flowchart showing steps of distributing an encryption key to the remote controller 2 from a main unit 1.
Figure 5:
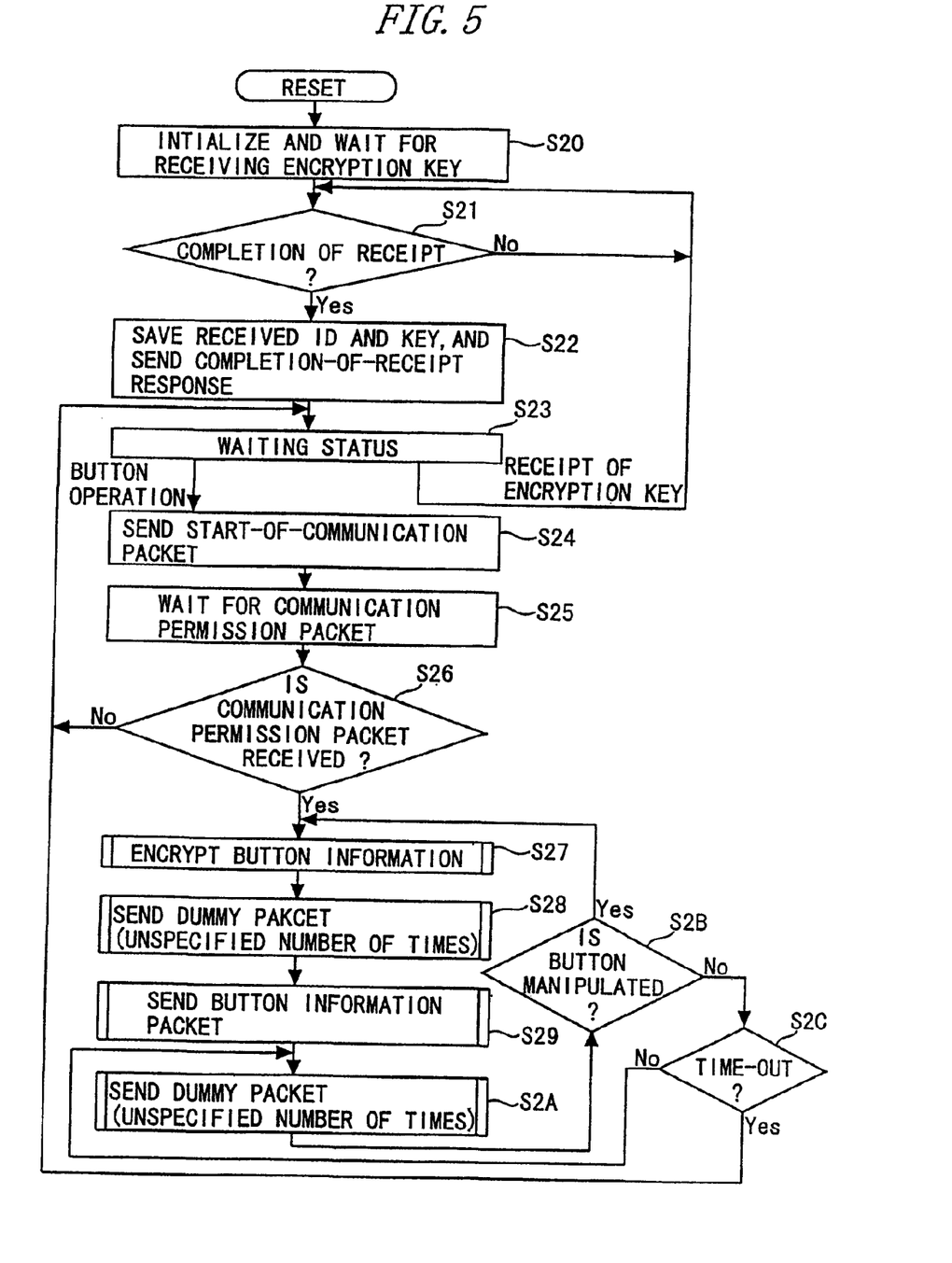
FIG. 5 is a flowchart showing a process when operating the remote controller.
Figure 6:
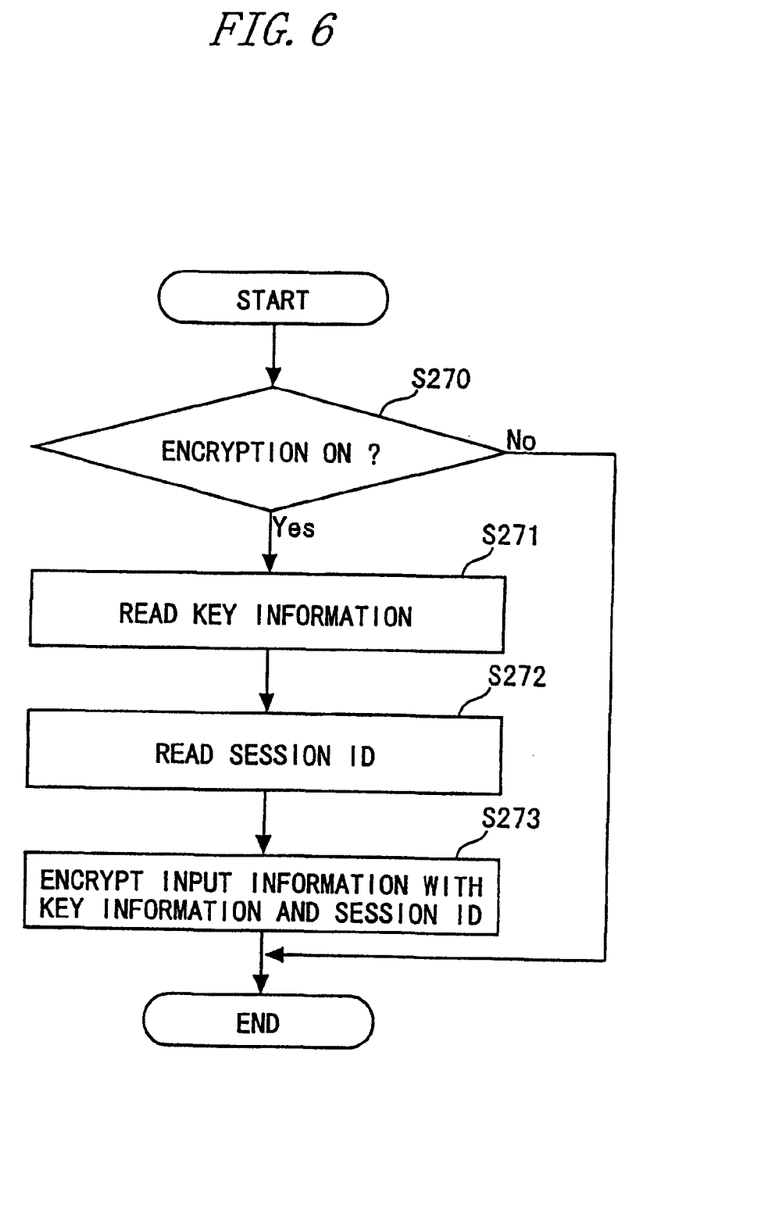
FIG. 6 is a flowchart showing details of a process of encrypting button information.
Figure 7:
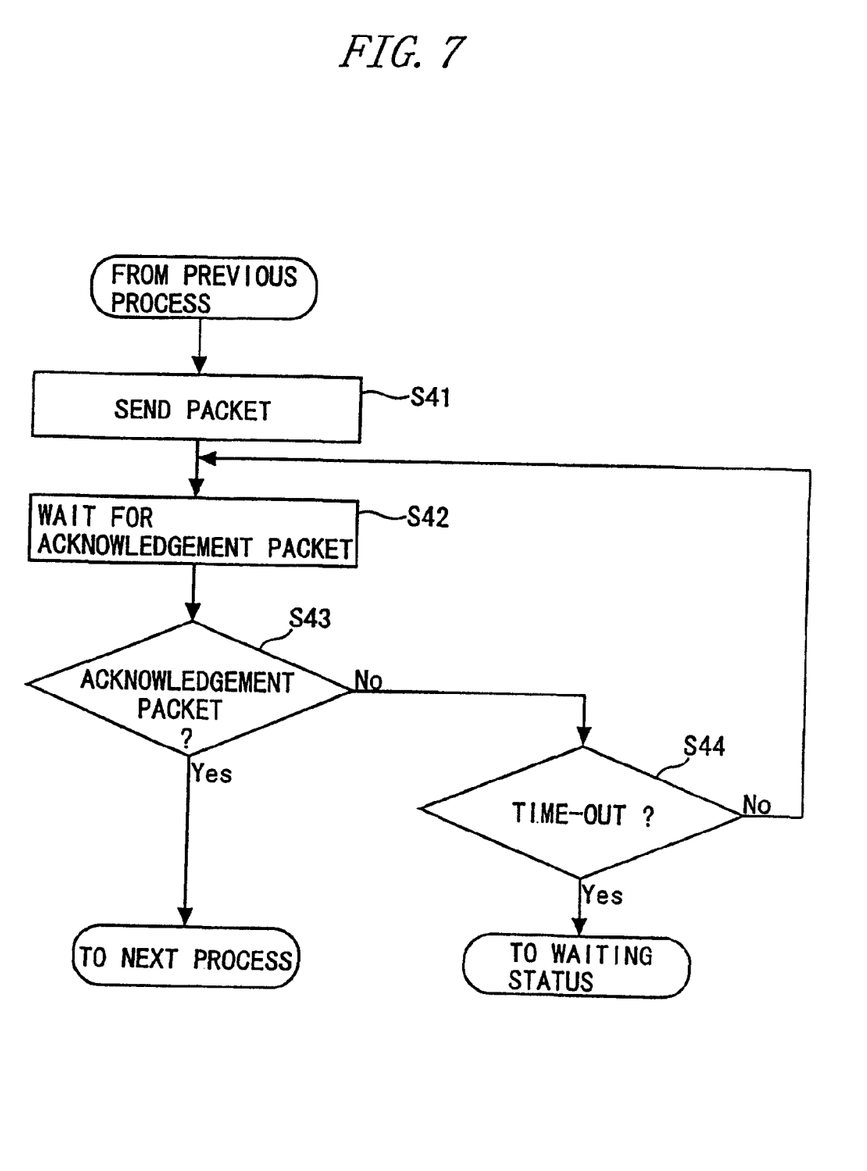
FIG. 7 is a flowchart showing details of a process of sending a button information packet and a dummy packet.
Figure 8:
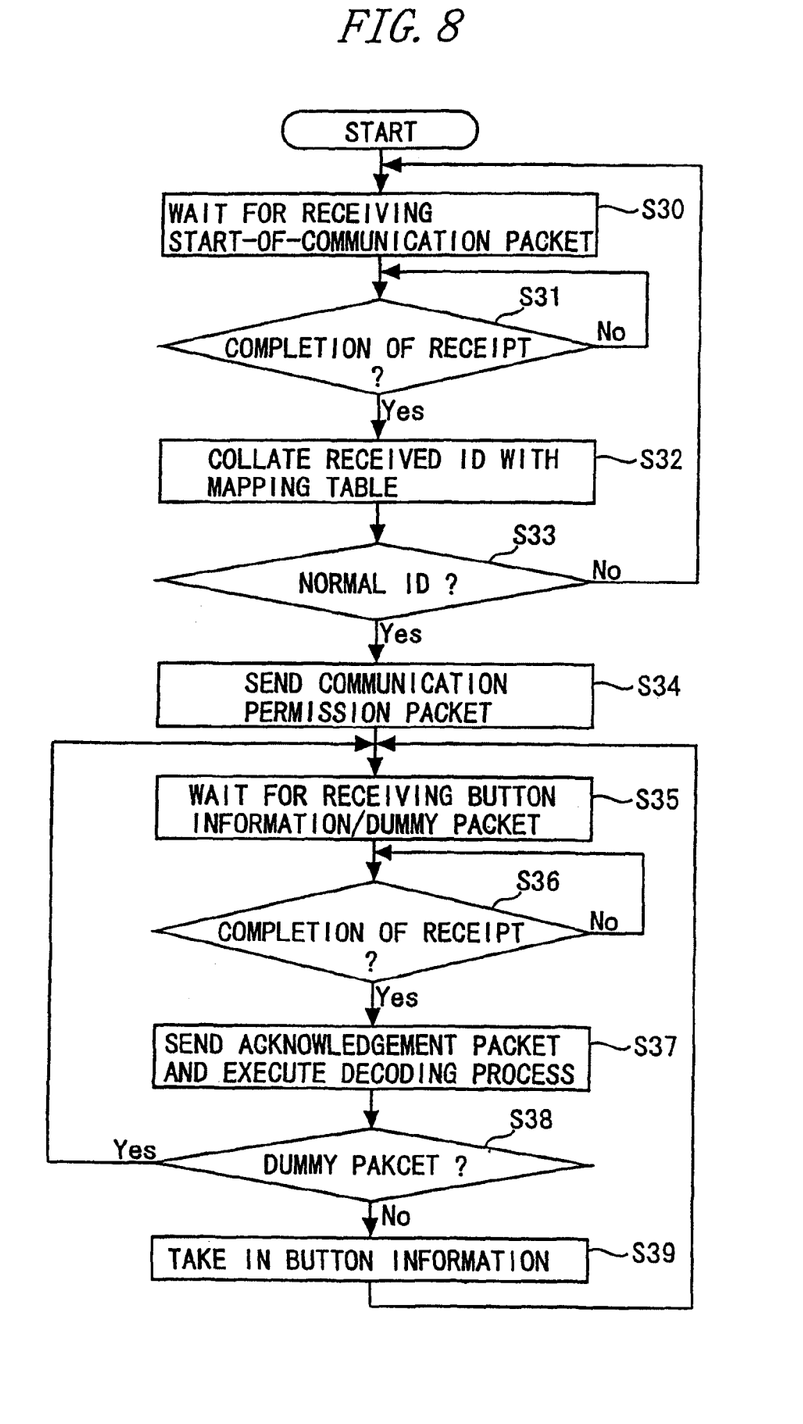
FIG. 8 is a flowchart showing a process when in a receiving operation of the main unit 1.

A first embodiment of the present invention will hereinafter be described with reference to FIGS. 1 through 8. FIG. 1 is a diagram showing an information system as a whole in the first embodiment. FIG. 2 is a block diagram showing a wireless remote controller 2. FIG. 3 is a diagram showing a data structure of a packet transmitted and received between a main unit 1 and the wireless remote controller 2. FIG. 4 is a flowchart showing steps of distributing an encryption key to the wireless remote controller 2 from the main unit 1. FIGS. 5 through 7 are flowcharts each showing a process when operating the wireless remote controller 2. FIG. 8 is a flowchart showing a process when the main unit 1 receives the packet.

<Outline of Functions>

The information system in the first embodiment is operated through wireless communications by the remote controller. This information system authenticates a user and issues an encryption key for every remote controller operated by the user. At this time the information system records the encryption key issued for every remote controller.

When the user operates the information system by the remote controller, input information is encrypted by the encryption key. Then, the remote controller transmits a start-of-communication request to the information system and transmits the encrypted input information.

The information system identifies the remote controller in response to the start-of-communication request transmitted from the remote controller. Then, the information system collates the encryption key issued to the requester remote controller with the key among those recorded. Subsequently, the information system decodes the input information with this encryption key and detects an operation of the user.

The encryption key is distributed in the following steps.

(1) A device on the main unit of the information system executes authenticating the user identity. This process is to confirm whether the user is qualified for receiving a distribution of key information.

(2) Next, the main unit confirms proximity of the remote controller to the device itself.

(3) Subsequently, the main unit generates an encryption key (e.g., a random number).

(4) The main unit transmits the encryption key via a safety communication path that prevents an interception (wiretapping).

(5) The main unit confirms that the remote controller receives the encryption key in safety.

<Whole Architecture>

FIG. 1 is the diagram showing the whole architecture of the present information system. As shown in FIG. 1, this information system is configured by the main unit 1 and the wireless remote controller 2.

The main unit 1 is categorized as an information processing device capable of communicating with an outside system via an unillustrated network. The main unit 1 may be, for example, a personal computer (which will hereinafter be abbreviated to PC), a digital TV, a set-top box and so on.

The main unit 1 includes a PC-equivalent function module 11, a remote controller proximity confirmation module 12, a remote controller communication module 13 and an authenticating function module 14.

The PC-equivalent function module 11 includes a CPU for providing an information processing function, a memory for storing the information and a communication interface for accessing the network. The architecture and operation thereof are nowadays broadly known, and hence their explanations are herein omitted. The PC-equivalent function module 11, based on this architecture, controls the main unit 1 and provides a variety of information processing functions.

For example, the PC-equivalent function module 11 generates the encryption key to be transmitted to the wireless remote controller. The generation of the encryption key involves generating a random number (or prime number) by a predetermined algorithm. The generated encryption key is required when in the remote communications and is therefore recorded and stored in the unillustrated memory of the main unit 1.

The PC-equivalent function module 11 embeds an ID for identifying the wireless remote controller into this key. Then, the PC-equivalent function module 11 records a mapping table containing the IDs of the wireless remote controllers 2 and the encryption keys distributed.

The ID may involve the use of a production number (serial number) of the wireless remote controller 2. Further, the ID of the remote controller may also be generated by use a random number. With this ID, the present information system can administer a plurality of remote controllers. If one single remote controller is to be used, the ID is not required. If there are other necessary pieces of information, these pieces of information may be contained in a part of the encryption key.

Further, the PC-equivalent function module 11 checks whether the wireless remote controller 2 surely receives the encryption key. In this case, the PC-equivalent function module 11 can confirm it simply by, for instance, indicating the wireless remote controller 2 to transmit the encryption key back. Moreover, the wireless remote controller 2 may transmit only a checksum of the encryption key back to the module 11. Even if failing to transmit the encryption key, the wireless remote controller 2 just falls into an unusable state and becomes usable by retrying the distribution steps. Accordingly, if the reliability of the encryption key transmission process is sufficiently high, there may be omitted the confirmation of whether the wireless remote controller 2 surely receives the encryption key.

The PC-equivalent function module 11 provides a function of authenticating the user identity. The authentication method includes a biometrics authentication using a fingerprint, sound spectrogram etc, a code number authentication, a password authentication and so forth. A method corresponding to a confidentiality required and an actualizing cost can be selected from those methods.

The authentication function module 14 checks based on the authentication method whether the user is qualified for indicating the distribution of the encryption key to the wireless remote controller 2. If the user is unqualified for indicating the distribution of the encryption key, the main unit 1 stops the process just when the user proves unqualified.

The remote controller proximity confirmation module 12 is, for instance, a push button and soon. The user, when making the wireless remote controller 2 proximal to the main unit 1, manipulates this remote controller proximity confirmation module 12 (e.g., presses the push button). With this manipulation, the main unit 1 recognizes the proximity of the wireless remote controller 2.

In this state, the main unit 1 performs wire communications or wireless communications using feeble radio waves with the wireless remote controller 2. The main unit 1 and the wireless remote controller 2 in such a state are illustrated in a lower part in FIG. 1.

The remote controller communication module 13 provides a function of transmitting the encryption key to the wireless remote controller 2. The remote controller communication module 13 is configured of a communication interface and a communication program. Interfaces categorized as a serial system such as RS232C, a parallel system pursuant to the Centronics Standard and other wire systems are usable as the communication interface.

Thus, the present information system involves the use of the hard-to-intercept wire system for transmitting the encryption key separately from the wireless communication interface. Note that wireless communication interface is, for example, an infrared-ray receiving module, a wireless LAN interface and so on. The wireless communications may, however, also be utilized for transmitting the encryption key by using an electromagnetic shield in combination.

Further, a close range wireless system incapable of communications at a predetermined distance or farther may also be used. In this case, the remote controller communication module 13 may incorporate both of the encryption key transmitting function and a function of receiving an encrypted operation signal from the wireless remote controller 2.

In this case, an interception countermeasure such as reducing a transmission output when in close proximity, may be taken together with the electromagnetic shield. Note that there is no limit to a data format for distributing the key information described above.

FIG. 2 is the block diagram showing the wireless remote controller 2. The wireless remote controller 2 shown in FIG. 2 includes a processing unit 21 for controlling the components of the wireless remote controller 2, a keyboard 22 for detecting a user's operation on the information system and generating input information, an encryption key receiving module 23 for receiving the encryption key from the main unit 1 of the information system, a memory 24 to and from which the processing unit 21 writes and read the information, a transmitting/receiving module 25 for transmitting and receiving the information in the wireless communications in accordance with an indication given from the processing unit 21, a display unit 26 for displaying various items of information, an encryption ON/OFF switch 27 for specifying whether the encryption is executed or not, and a power unit (battery) for supplying the electric power to the wireless remote controller 2.

The processing unit 21 is, for instance, a microprocessor. The processing unit 21 executes a control program loaded in the memory 24, thereby providing the function of the wireless remote controller 2. For example, the processing unit 21 receives the encryption key from the main unit 1 via the encryption key receiving module 23. Further, the processing unit 21 encrypts the information to be transmitted to the main unit by use of the encryption key received.

The keyboard 22 contains, in addition to alphabetic and numeral keys, a variety of buttons, an ON/OFF switch and so on. The user inputs an indication to the information system by manipulating these keys, buttons and switch.

The encryption key receiving module 23 is defined as a communication interface corresponding to the remote controller communication module 13 of the main unit 1 described above.

The memory 24 is constructed of a random access memory (RAM) and a read-only memory (ROM). The memory 24 is stored with programs executed by the processing unit 21 and tables used by the processing unit 21.

The transmitting/receiving module 25 is a communication interface for performing the wireless communications with the main unit 1. The transmitting/receiving module 25 is, e.g., an infrared-ray emitting module and an infrared-ray receiving module, and a wireless LAN interface.

The display unit 26 displays an operation state of the wireless and so on. For example, the display unit 26 is a power lamp, etc.

The encryption On/Off switch 27 specifies whether the information is encrypted in the processing unit 21. This encryption On/Off switch is, provided so that the present wireless remote controller 2 is used for the general purpose, for an example, in a case that the information needs to be encrypted in the communications with a TV receiver etc and an operation signal of an air-conditioner does not require the encryption (which means that a control unit of the air-conditioner is not adapted to the encryption). The user does an on/off setting of the encryption in accordance with a target operated by the wireless remote controller 2 by use of the encryption On/Off switch 27.

<Data Structure>

FIG. 3 shows an example of the data structure of wireless communication data (which will hereinafter be referred to as a packet) transferred and received between the main unit 1 and the wireless remote controller 2. As shown in FIG. 3, according to the present information system, a start-of-communication packet, a communication permission packet, a button information/dummy packet and an acknowledgement packet are prepared as packets of this category.

The start-of-communication packet is used for the wireless remote controller 2 to request the main unit 1 to start the communications. As shown in FIG. 3, the start-of-communication packet has fields stored with a header, a packet ID, a remote controller ID, a piece of dummy data and a checksum.

The header is defined as a bit string that indicates the packet transferred and received between the main unit 1 and the wireless remote controller 2 in the present information system. Referring to FIG. 3, a bit string "55AA" (hexadecimal number) is exemplified as the header.

The packet ID is an identification number specifying a category of the packet. Referring again to FIG. 3, the ID "0000" is specified in the start-of-communication packet.

The dummy data in the start-of-communication packet is defined as a bit string embedded in an unused field of the start-of-communication packet. Further, the checksum is defined as a piece of information for confirming a validity of the data when receiving the packet.

The communication permission packet is a packet used for the main unit 1 to notify the wireless remote controller 2 of a communication permission in response to the start-of-communication packet sent from the wireless remote controller 2. As shown in FIG. 3, the communication permission packet has fields stored with a header, a packet ID, a remote controller ID, a session ID, apiece of dummy data and a checksum.

The header, the packet ID, the remote controller ID, the dummy data and the checksum among these pieces of data are the same as those in the start-of-communication packet. Further, the main unit 1 notifies the wireless remote controller 2 of the session ID each time the communication permission or receipt acknowledgement is made. The wireless remote controller 2 encrypts the input information with the received key information and this session ID.

The button information/dummy data packet is categorized into a button information packet and a dummy packet. The button information packet is used for the wireless remote controller 2 to transmit the button information (input information of the button manipulated by the user) to the main unit 1. Further, the dummy packet is used for transmitting the dummy data.

As shown in FIG. 3, the button information/dummy packet has fields stored with a header, a packet ID, a remote controller ID, encrypted button information or dummy data and a checksum.

The encrypted button information among these pieces of data is a piece of input information generated when the user operates the wireless remote controller 2. The button information is previously encrypted with the encryption key and the session ID that have been transmitted from the main unit 1 to the wireless remote controller 2. Moreover, the dummy packet is a packet for preventing a third party from intercepting (wiretapping) the button information packet. The dummy packet contains dummy data simulating the button information. An unspecified number of dummy packets are transmitted before and after the button information packet.

The acknowledgement packet is a packet used for the main unit 1 to notify the wireless remote controller 2 of an acknowledgement in response to the button information/dummy packet sent from the wireless remote controller 2. As shown in FIG. 3, the acknowledgement packet has fields stored with a header, a packet ID, a remote controller ID a "checksum of the received packet", a next session ID, and a checksum.

The "checksum of the received packet" among those pieces of data is a checksum of the packet received at the previous session. Further, the next session ID is used for encrypting the button information next time.

<Operation>

FIG. 4 is the flowchart showing an example of an encryption key distributing process. This process is a process of the program executed by the main unit 1 (the PC-equivalent function module 11) when the main unit 1 transmits the encryption key to the wireless remote controller 2.

In this process, the main unit 1 at first executes authenticating the user's identity (S10). The authentication of the user's identity involves reading the remote controller ID, reading the authentication information from the user and confirming the authentication information. The authentication information given from the user includes a fingerprint, a sound spectrogram, a code number or a password.

Next, the main unit 1 judges based on a result of this authentication whether the user is qualified for receiving the distribution of the encryption key (S11). This judgment is made based on a comparison between the given authentication information and the authentication information registered in the main unit 1. The main unit 1, when judging that the user is unqualified and is therefore unauthorized user, aborts the process.

Whereas if judging that the user is qualified, the main unit 1 next waits for the wireless remote controller 1 to approach the main unit 1 itself (S12). Then, the main unit 1 judges whether the wireless remote controller is in close proximity to the main unit 1 itself (S13).

Then, if the wireless remote controller 2 is not in close proximity, the main unit 1 judges whether it is a time-out or not (S14). If not the time-out, the main unit 1 returns the control to S12. Whereas if it is the time-out, the main unit aborts the process.

When judging in S13 that the wireless remote controller 2 gets approached, the main unit 1 generates the encryption key (S15). Next, the main unit 1 transmits the encryption key to the wireless remote controller 2 (S16).

Subsequently, the main unit 1 waits for a response from the wireless remote controller (S17). If there is no response, the main unit 1 judges whether it is the time-out (S19). Then, if not the time-out, the main unit 1 returns the control to S17. Whereas if it is the time-out, the main unit 1 aborts the process.

When judging in S18 that there is the response, the main unit 1 judges whether this response is normal (S1A). If not normal, the main unit 1 returns the control S12, and repeats the same process.

When judging in S1A that the response is normal, the main unit 1 creates and updates a mapping table stored with the remote controller ID and the encryption key (S1B). Thereafter, the main unit 1 finishes the process.

FIG. 5 shows the flowchart shoring the operation of the wireless remote controller. This process is a process of the program executed by the processing unit 21 of the wireless remote controller 2. An execution of this process is triggered by power-on of the wireless remote controller 2 or by pressing an unillustrated reset button.

In this process, to start with, the wireless remote controller 2 initializes the wireless remote controller 2 itself and comes to a status of waiting for the encryption key (S20). Next, the wireless remote controller 2 judges whether the receipt of the encryption key is completed (S21).

When the receipt of the encryption key is completed, the wireless remote controller 2 saves the received encryption key together with its own remote controller ID, and sends a completion-of-receipt response (S22). Thereafter, the wireless remote controller 2 comes to a waiting status (S23). This waiting status continues till a new encryption key is transmitted or a user's button manipulation is detected.

Namely, when the receipt of the encryption key is started, the wireless remote controller 2 returns the control to S21, and confirms the completion of the receipt. On the other hand, when detecting the user's button manipulation, the wireless remote controller 2 sends the start-of-communication packet (S24).

Then, the wireless remote controller 2 waits for the communication permission packet (S25). Subsequently, if unable to receive the communication permission packet from the main unit 1 in wait for a predetermined time, the wireless remote controller 2 shifts to the waiting status (S23).

While on the other hand, when receiving the communication permission packet, the wireless remote controller 2 executes encrypting the button information (S27). Namely, the wireless remote controller 2 encrypts the input information generated by the user's button manipulation.

Next, the wireless remote controller 2 sends a dummy packet (S28). The number of times with which the dummy packet is sent is unspecified (random).

Next, the wireless remote controller 2 sends a button information packet (S29). Next, the wireless remote controller 2 sends a dummy packet (S2A). The number of times with which the dummy packet is sent is too unspecified (random).

Next, the wireless remote controller 2 judges whether the button is manipulated (S2B). Further, if manipulated, the wireless remote controller 2 returns the control to S27.

Whereas if not manipulated, the wireless remote controller 2 judges whether it is a time-out or not (S2C). if not the time-out, the wireless remote controller 2 returns the control to S2A. With this process, the dummy packet is transmitted an unspecified number of times till it comes to the time-out even when the user does not operate the wireless remote controller 2. Whereas if it is the time-out, the wireless remote controller 2 shifts to the waiting status (S23).

FIG. 6 shows a detailed process of encrypting the button information (S27 in FIG. 5). In this process, the wireless remote controller 2, to begin with, judges whether the encryption On/Off switch 27 is switched ON (S270).

If the encryption On/Off switch 27 is switched OFF, the wireless remote controller 2 finishes the button information encryption process. Whereas if the encryption On/Off switch 27 is switched ON, the wireless remote controller 2 reads the key information (S271).

Next, the wireless remote controller 2 reads the session ID (S272). This session ID is obtained from the communication permission packet or the acknowledgement packet (see FIG. 3).

Next, the wireless remote controller 2 encrypts the input information with the key information and the session ID (S273). Thereafter, the wireless remote controller 2 finishes the button information encryption process.

FIG. 7 shows details of the process of sending the button information packet and the dummy packet (S28, S29 or S2A)

In this process, the wireless remote controller 2 at first sends the packet (the button information packet or the dummy packet) (S41).

Next, the wireless remote controller 2 waits for the acknowledgement packet (S42). Then, the wireless remote controller 2 judges whether the acknowledgement packet is received (S43). If the acknowledgement packet is received, the wireless remote controller 2 advances the control to the next process.

While on the other hand, when judging in S43 that the acknowledgement packet is not yet received, the wireless remote controller 2 judges whether it is a time-out (S44). If not the time-out, the wireless remote controller 2 returns the control to S42 (S44). If not the time-out, the wireless remote controller 2 returns the control to S42. Whereas if judging in S44 that it is the time-out, the wireless remote controller 2 shifts to the waiting status.

FIG. 8 is the flowchart showing a receiving operation of the main unit 1. Upon a start of this process, the main unit 1 comes to a status of waiting for receiving the start-of-communication packet (S30). Then, the main unit 1 judges whether the receipt of the start-of-communication packet is completed (S31).

Then, when the receipt of the start-of-communication packet is completed, the wireless remote controller 2 collates the received remote controller ID (simply written as ID in FIG. 6) with the mapping table (created and updated in S1B in FIG. 4) (S32).

Next, the main unit 1 judges whether the received remote controller ID is valid (S33). If judged to be invalid, the main unit 1 returns the control to S30.

Whereas if valid, the main unit 1 sends the communication permission packet (S34). Next, the main unit 1 comes to a status of waiting for the button information/dummy packet. Then, the main unit 1 judges whether the receipt of the button information/dummy packet is completed (S36).

The main unit 1, when the receipt of the button information/dummy packet is completed, sends the acknowledgement packet and further executes a decoding process (S37).

Subsequently, the main unit 1 judges whether the received packet is a dummy packet (S38). If judged to be the dummy packet, the main unit 1 returns the control to S35.

If not the dummy packet, the main unit 1 takes in the button information (S39). Thereafter, the main unit 1 returns the control to S35.

<Effects of Embodiment>

As discussed above, according to the information system in the first embodiment, the button information generated when operating the wireless remote controller 2 with respect to the main unit 1 or the information system, is encrypted. It is therefore feasible to decrease the possibility in which the operation signal generated when the information system is operated through the wireless remote controller 2 might be intercepted by the third party.

Further, on such an occasion, according to the present information system, the main unit 1 distributes the encryption key to the wireless remote controller 2 in the wire communications in a way that brings the wireless remote controller 2 into contact with the main unit 1 or the wireless communications using the feeble radio waves with the wireless remote controller 2 disposed in close proximity to the main unit 1. Hence, it is possible to reduce such a risk that the encryption key itself might be intercepted (wiretapped) by the third party.

Moreover, according to the information system in the first embodiment, the information communications are carried out in a predetermined shake-hand procedure, for instance, as by the start-of-communication packet and the response packet responding thereto. It is therefore possible to reduce the risk that the operation signal generated when operating the information system through the wireless remote controller might be intercepted by the third party.

Further, according to the information system in the first embodiment, for example, the dummy packets are transmitted before and after transmitting the button information packet. Hence, it is feasible to decrease the risk that the operation signal generated when operating the information system through the wireless remote controller 2 might be intercepted by the third party.

<Modified Example>

According to the first embodiment discussed above, the main unit 1 and the wireless remote controller 2 communicate with each other by use of the packets as shown in FIG. 3. The embodiment of the present invention is not, however, limited to the architecture and steps described above. For example, the start-of-communication packet basically capable of transferring (containing) the remote control ID may suffice, and the header, the packet ID etc may be or may not be added as the necessity arises.

Moreover, a data size of the packet may be a fixed length or a variable length. In the case of the fixed length, the length may be adjusted by using the dummy data shown in FIG. 3.

In the embodiment discussed above, the key information is passed to the encryption key receiving module 23 of the wireless remote controller 2 in the communications from remote controller communication module 13 of the main unit 1 to the wireless remote controller 2. The embodiment of the present invention is not, however, limited to this architecture. The key information may be passed to the wireless remote controller 2 from the main unit 1 through a readable-by-computer recording medium such as a flash memory card and so on.

In this case, the writing portion (e.g., a card slot) to the recording medium may be provided in the main unit 1. Further, the wireless remote controller 2 may be provided with a reading portion (e.g., the card slot) from the recording medium. Configurations of these accessing devices to the recording medium are broadly known, and hence their explanations are herein omitted.

In the embodiment discussed above, the input information is encrypted with the encryption key and the session ID. The embodiment of the present invention is not, however, confined to this method. For instance, the input information may be encrypted with only the encryption key without using the session ID.

Moreover, it is considered that all appliances in home are controlled by one single remote controller. In the case of utilizing the remote controller incorporating the encrypting function, On/Off states of the air-conditioners, the channels of the TV and operations of a personal computer are all encrypted.

For an example, the On/Off signals of the air-conditioner among these operations do not need the encryption, and there might be a case where it is difficult to provide the air-conditioner with the encrypting/decrypting function. In such a case, the remote controller may make an option of the encryption or non-encryption according to the necessity and may thus perform the communications. In this case, the encryption On/Off switch 27 shown in FIG. 2 may be set OFF.

Alternatively, the PC is entrusted with all the remote controller communications and my decode by totally using the encrypted communications. In this case, if there is not the PC, the appliance can not be controlled, and the remote controller is unusable. Accordingly, it follows that a range of utilizing such a system is limited.

<<Second Embodiment>>

Figure 9:
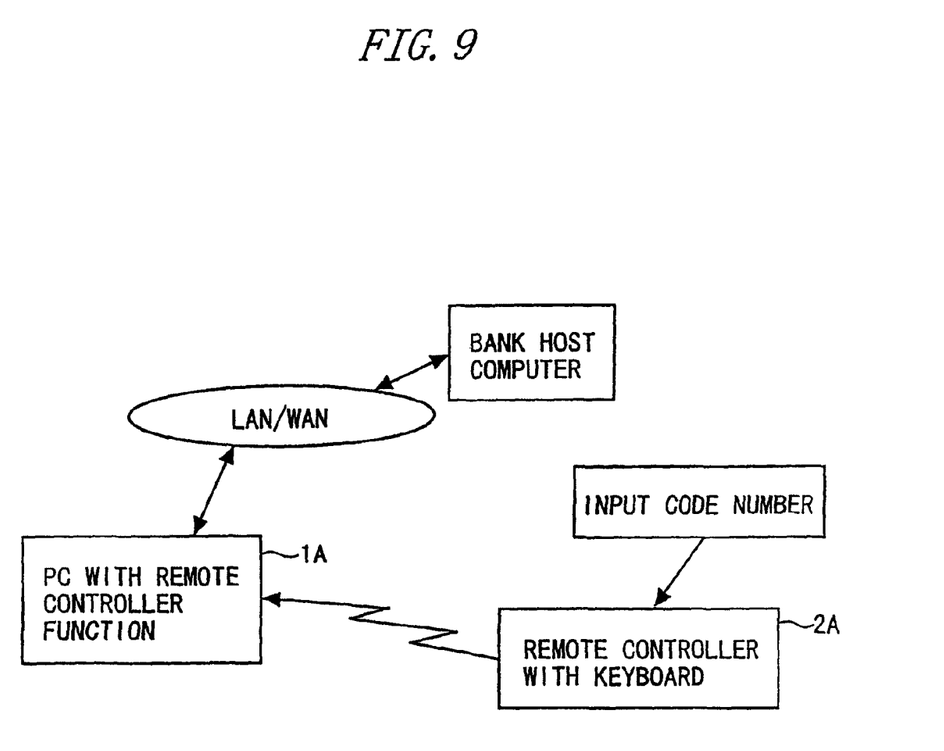
FIG. 9 is a diagram showing a system architecture of an information system for executing home banking in a second embodiment of the present invention.

A second embodiment of the present invention will hereinafter be described referring to FIG. 9. FIG. 9 is a diagram showing a system architecture of an information system for executing home banking in the second embodiment.

The discussion in the first embodiment has been focused on the architecture and the operation of the information system including the wireless remote controller 2 having the encrypting function and the main unit 1 operated by the wireless remote controller 2. The second embodiment will exemplify a case where this information system is applied to home banking. Other configurations and operations in the second embodiment are the same as those in the first embodiment. Such being the case, the same components are marked with the same numerals, and their repetitive explanations are omitted. Further, the reference to the drawings in FIGS. 1 through 8 will be made as the necessity may arise.

This information system is configured by a PC 1A implementing a remote controller function (which will hereinafter be abbreviated to the RC function), a remote controller 2A provided with a keyboard for operating the PC 1A, and a bank host computer connected to the PC 1A via LAN (Local Area Network)/WAN (Wide Area Network).

The configuration and the operation of the PC 1A with the RC function are the same as those of the main unit 1 in the first embodiment. Further, the configuration and the operation of the remote controller 2A with the keyboard are the same as those of the wireless remote controller 2 in the first embodiment.

The user inputs a code number to the PC 1A with the RC function through the remote controller 2A with the keyboard in the home banking. The communication from the remote controller 2A with the keyboard to the PC 1A with the RC function is similarly encrypted as in the information system according to the first embodiment. This architecture is capable of reducing the possibility in which the code number etc is intercepted (wiretapped) by the third party when utilizing the home banking.

Note that the security in the communication from the PC 1A with the RC function via the LAN/WAN to the bank host computer has hitherto been ensured by the variety of methods.

Accordingly, the PC 1A with the RC function and the remote controller 2A with the keyboard in the second embodiment cover an area that has hitherto been considered to be lowest in security in the home banking.

<Modified Example>

The second embodiment discussed above has exemplified the case where the keyboard-attached remote controller 2A incorporating the encrypting function is applied to the home banking. The embodiment of the present invention is not, however, limited to this applied example. Namely, the remote controller 2A with the keyboard and the wireless remote controller with the encrypting function shown in the first embodiment, can be applied to various categories of information systems.

For example, the system described above can be applied when connected to an Internet provider. This is because the a password when connected to the Internet provider can be used in the same way as a credit card. The system for the encryption on the network and on the telephone line is getting sophisticated, and hence an area exhibiting the lowest confidentiality may be the remote controller as viewed from the whole system. Accordingly, the wireless remote controller 2 enhances such a lowest-security area, i.e., enhances essentially the security of the system on the whole.

<<Third Embodiment>>

Figure 10:
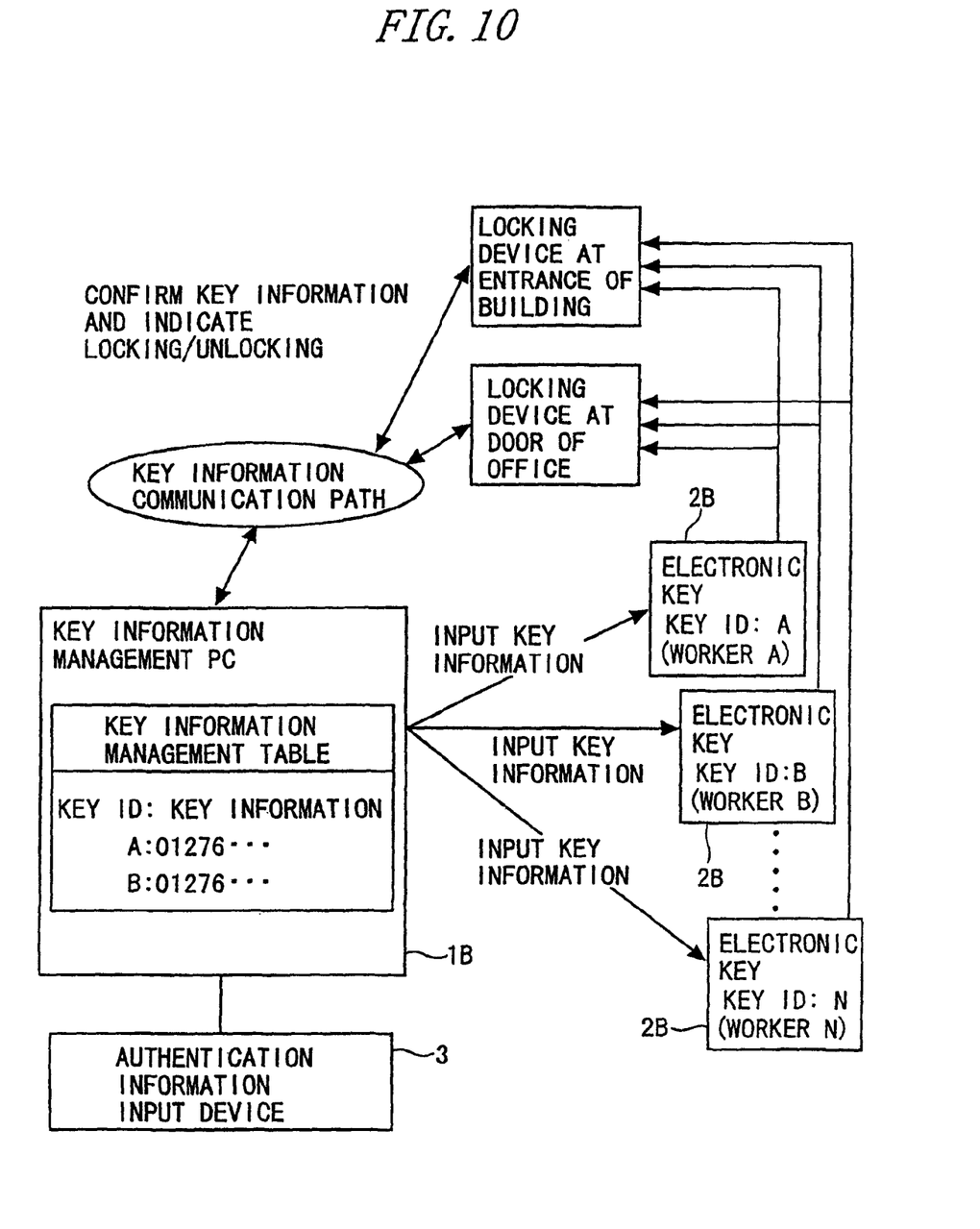
FIG. 10 is a diagram showing a system architecture of an information system for executing a security management of an office in a third embodiment of the present invention.

A third embodiment of the present invention will be explained with reference to FIG. 10. FIG. 10 is a diagram showing a system architecture of an information system for executing a security management in an office according to the third embodiment.

This system is configured by a key information management PC 1B for issuing an electronic key 2B used for an office worker to enter the room, an authentication information input device 3 for authenticating an issuer of the key information, a lock management device at an entrance of the building, a lock management device at a door of the office, and a key information communication path that connects these lock management devices to the key information management PC 1B.

A configuration of the key information management PC 1B is the same as that of the main unit 1 in the first embodiment. According to the third embodiment, the key information management PC 1B has a key information management table for managing the issued key information for every electronic key 2B of the key receiver. This key information management table is a mapping of IDs of the electronic keys 2B to the issued key information.

The authentication information input device 3 serves to authenticate whether the issuer issuing the key information is valid. This authentication information input device 3 is, for example, a fingerprint reader, a sound spectrogram analyzer, a keyboard for inputting a code number or a password, and so forth.

The electronic key 2B includes a memory for recording the key information. The electronic key 2B, for instance, a card formed with magnetic stripes, an IC card, or a stick recorded with magnetism- or IC-based information.

When the key information of the this electronic key 2B is inputted to the lock management device at the entrance of the building or at the door of the office, the key ID of the electronic key 2B and the key information are transmitted via the key information communication path to the key information management PC 1B. Then, if the key information management table has already been stored with the mapping of the key ID to the key information, the key information management PC 1B transmits an unlock command the lock management device, thereby unlocking the entrance or the door.

This electronic key 2B is distributed to the worker who unlocks the entrance of the building or the door of the office. Then, if the number of such new workers increases, the issuer of which the authentication information is registered issues the key information.

Namely, the issuer at first authenticates the issuer himself or herself by use of the authentication information input device 3, and next commands the key information management PC 1B to issue the key information. The key information is thereby written to the new electronic key 2B. In this case, the ID of the electronic key 2B and the key information are entered in the key information management table.

Note that if the electronic key 2B is lost, the worker concerned notifies the issuer that the key 2B is lost. The issuer deletes the key information of the electronic key 2b distributed to that worker from the key information management table. Further, the issuer input the key information a new electronic key 2B in the same procedures and transfers it to the worker concerned.

Thus, according to the system in the third embodiment, the authenticated issuer can simply issue he electronic key 2B. Moreover, in case the electronic key 2B is lost, the lost electronic key 2B can be made ineffective without exerting any influence on other workers.

<<Non-transitory Readable-by-Computer Recording Medium>>

The program executed by the computer to actualize any one of the processes (functions) described above in the embodiments discussed above may be recorded on a non-transitory readable-by-computer recording medium. Then, the computer reads and executes the program on this non-transitory recording medium, thereby providing the function of the main unit 1, the PC 1A with the RC function, the encryption key issuing device 1B, the wireless remote controller 2, or the remote controller 2A with the keyboard shown in the embodiment discussed above.

Herein, the non-transitory readable-by-computer recording medium embraces recording mediums capable of storing information such as data, programs, etc. electrically, magnetically, optically and mechanically or by chemical action, which can be all read by the computer. What is demountable out of the computer among those non-transitory recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type non-transitory recording mediums within the computer.

The invention claimed is:

1. A wireless apparatus, comprising:
   a button;
   a wireless communication interface;
   a processing unit to output encryption key information to another wireless apparatus using the wireless communication interface with lower transmission output than transmission output of information other than the encryption key information, responsive to detection of user's operation for the button; and
   a memory to store the output encryption key information corresponding to the another wireless apparatus,
   wherein the wireless communication interface receives wireless signals from the another wireless apparatus and the processing unit decodes the information contained in the wireless signals and encrypted with the encryption key information.

2. The wireless apparatus according to claim 1, wherein the wireless communication interface comprises a near communication module incapable of performing communications beyond a predetermined distance, the near communication module forms a communication path for outputting the encryption key information within the predetermined distance.

3. The wireless apparatus according to claim 1, further comprising a wire communication interface.

4. A encryption key information managing method of managing encryption key information, comprising:
- detecting user's operation for a button of a wireless apparatus;
- generating encryption key information responsive to the detecting;
- outputting the encryption key information to an another wireless apparatus using a wireless communication interface of the wireless apparatus with lower transmission output than transmission output of information other than the encryption key information;
- storing the output encryption key information corresponding to the another wireless apparatus;
- receiving wireless signals from the another wireless apparatus; and
- decoding the information contained in the wireless signals and encrypted with the encryption key information.

5. The encryption key information managing method according to claim 4, wherein the wireless communication interface comprises a near communication module incapable of performing communications beyond a predetermined distance, and the outputting outputs the generated encryption key information through the near communication module.

6. A non-transitory readable-by-computer recording medium recorded with a program executed by a computer to manage encryption key information, comprising:
- detecting user's operation for a button of a wireless apparatus;
- generating encryption key information responsive to the detecting;
- outputting the encryption key information to another wireless apparatus using a wireless communication interface of the wireless apparatus with lower transmission output than transmission output of information other than the encryption key information;
- storing the output encryption key information corresponding to the another wireless apparatus;
- receiving wireless signals from the another wireless apparatus; and
- decoding the information contained in the wireless signals and encrypted with the encryption key information.

7. The non-transitory readable-by-computer recording medium recorded with a program according to claim 6, wherein the wireless communication interface comprises a near communication module incapable of performing communications beyond a predetermined distance, and the outputting outputs the generated encryption key information through the near communication module.

* * * * *